United States Patent [19]

Gray

[11] Patent Number: 5,186,052

[45] Date of Patent: Feb. 16, 1993

[54] STORM WATER FLOW MONITORING

[75] Inventor: Keith Gray, Villa Park, Ill.

[73] Assignee: Environmental Monitoring and Technologies, Inc., Morton Grove, Ill.

[21] Appl. No.: 741,579

[22] Filed: Aug. 7, 1991

[51] Int. Cl.⁵ .............................................. G01F 1/20
[52] U.S. Cl. ...................................................... 73/215
[58] Field of Search ............ 73/215, 216, 861, 863.41, 73/863.43, 863.58, 864.73

[56] References Cited

U.S. PATENT DOCUMENTS

| | | | |
|---|---|---|---|
| 3,340,871 | 9/1967 | Jellies | 73/215 X |
| 3,487,808 | 1/1970 | Perkins | 73/216 X |
| 3,719,081 | 3/1973 | Lynn . | |
| 3,871,231 | 3/1975 | Ciarico | 73/215 |
| 3,929,017 | 12/1975 | Kowalski . | |
| 3,954,009 | 5/1976 | Lederer . | |
| 4,213,336 | 7/1980 | Schweickart et al. | 73/215 X |
| 4,346,596 | 8/1982 | Diamant et al. | 73/215 X |
| 4,476,719 | 10/1984 | Millar et al. | 73/215 X |
| 4,554,687 | 11/1985 | Carter et al. | 73/216 X |
| 5,033,310 | 7/1991 | Graybeal | 73/861 |
| 5,062,304 | 11/1991 | Van Buskirk et al. | 73/861 |

FOREIGN PATENT DOCUMENTS 2447261  3/1976  Fed. Rep. of Germany .

Primary Examiner—Herbert Goldstein
Attorney, Agent, or Firm—David D. Kaufman

[57] ABSTRACT

Apparatus and a method for monitoring the rate of flow of storm water in an individual sewer. The apparatus comprises a collector bowl mountable beneath the storm sewer manhole cover and positioned to collect all water entering through the manhole cover. A flow pipe is mounted in the bowl and projects upwardly from the bottom thereof. Water collected in the bowl must rise to a level above the flow pipe before it will flow through the pipe and into the sewer. A flow meter sensitive to the water height above the flow pipe is positioned in the bowl and measures and records the rate of flow.

6 Claims, 2 Drawing Sheets

STORM WATER FLOW MONITORING

BACKGROUND OF THE INVENTION

This invention relates generally to pollution control and the measurement and sampling of water effluent discharge and, more particularly, to a monitoring method and apparatus for measuring and sampling storm water run-off.

Growing concern over further pollution of rivers, streams, lakes and other bodies of water has given rise to more and stricter regulations governing the discharge and treatment of wastewater effluent. As a general rule, industrial run-off and municipal run-off are channeled through a sewer system for discharge into a large or flowing body of water. Depending on the flow rate and toxic material content of the run-offs, the effluent may require flow restraint and/or treatment before discharge. Continuous and relatively accurate monitoring and sampling of effluent run-off has thereby become essential.

In a typical sewer system, there is a substantially continuous stream of water flowing through an aqueduct, pipe or channel that is substantially horizontal. Streams of that type, known as open channel streams or flows, have long been monitored by a variety of methods and devices developed for that purpose. Examples of such known methods and devices may be found in U.S. Pat. Nos. 3,719,081, showing a flume arrangement and a pressure probe generating an electronic signal translatable into a flow rate; 3,929,017, showing a weir arrangement and a bubbler device responsive to the pressure required for gas bubbles to rise through a head of water; and 3,954,009 showing a float device associated with a weir arrangement. Weirs, flumes, and the like, are known as primary measuring devices and, as indicated in the said '017 patent, formulas have been developed for converting the height of liquid rise caused by the device into a flow rate based on the characteristics of the particular device.

Another primary measuring device is a plain cylindrical tube or pipe through which water flows in an open channel by gravity. That type of open channel flow is traditionally measured by the well known Manning formula wherein the slope of the hydraulic gradient is a factor so that the measured rate of flow is proportional to the slope of the pipe which normally will be some variance from the horizontal.

The various sensing devices and flow meters are known as secondary measuring devices which are adapted to automatically convert a sensed signal into a flow rate and also record the flow rate. The flow meters typically are programmable to the different types of primary measuring devices so that the proper conversion and flow rate is obtainable under varying flow conditions.

More recently, another source of potential water pollution has come under scrutiny, namely, storm water run-off. Storm sewers can be found in virtually all industrial facilities as well as commercial areas such as shopping malls and the like. The storm sewers are positioned and designed to be the collection point for storm water from building downspouts and paved or unpaved areas that require draining. Environmental Protection Agency (EPA) studies recently conducted have indicated that storm water run-off from urban and industrial sites carries a considerable amount of pollutants. As a result, the EPA has in late 1990 issued extensive regulations which apply to industrial and municipal storm water discharges.

As a general rule, storm sewers are remote from a main wastewater sewer system or wastewater treatment plant. Water flowing into a particular storm sewer thus must flow independently through its own drainage channel before it can be merged with and flow into the main sewer system. Understandably, the storm water run-off of a given individual location is intermittent, depending on weather conditions, and of greatly reduced volume compared to the wastewater discharge flowing in a main municipal storm sewer system. Since monitoring of individual storm sewers is often required by the EPA regulations, use of the described primary measuring devices like flumes and weirs for monitoring under such conditions is no longer practical or effective.

There thus exists a need for a flow rate measurement and sampling means for monitoring the run-off in an individual storm sewer. A device for achieving such monitoring should be simple to install in a storm sewer and yet provide sufficiently accurate results as required by regulations.

SUMMARY OF THE INVENTION

The present invention provides a method and apparatus for monitoring storm water run-off in individual storm sewers. The apparatus may be readily and conveniently installed in a conventional storm sewer having an apertured manhole cover where it is effective for monitoring storm water entering that sewer.

Briefly, the invention comprises a liquid-impermeable bowl or dish-like collector provided with a peripheral flange. The collector is supportable on the rim of a conventional storm sewer manhole and also beneath the apertured manhole cover which serves to hold the operationally mounted collector in place. Any storm water entering the sewer through the manhole cover necessarily accumulates in the collector.

A drain or flow pipe is mounted in a central opening of the collector and projects upwardly therefrom. In one embodiment of the invention the flow pipe comprises an upright leg and an elbow with a substantially horizontal arm. Water accumulating in the collector must rise above the lower edge of the mouth of the flow pipe arm before it can begin to flow through the flow pipe and into the sewer. Rate flow sensing means, such as commercially available bubbler devices and flow meters, is associated with the collector and flow pipe. The bubbler device is positionable at the bottom of the collector and generates a signal, proportional to the depth of discharge in the horizontal arm, which signal is converted by the programmable flow meter into a rate of flow. In most situations, the rim of the sewer manhole is not absolutely horizontal so that the leg of the flow pipe will not be perfectly vertical nor the upper arm perfectly horizontal. Under those conditions, the conversion formula utilized in the programmed meter will be the Manning formula previously described to account for the slope of the arm.

In another embodiment of the invention, the flow pipe comprises a plain upright pipe without the horizontal arm. Flow meters of the type described may be programmed to measure and record the rate of the flow through a vertical pipe with even greater accuracy than is obtainable with the Manning formula. Such measurement requires that the flow pipe be virtually perfectly perpendicular, which condition will obtain when the manhole rim is virtually perfectly level or horizontal. Alternatively, the collector flange may be provided with simple leveling means for achieving the desired level mounting.

Means is provide for making the flow pipe easily removable from its mounting in the collector. As a result, pipes of varying diameters may be readily substituted and positioned depending on the severity of the impending storm or the empirically determined approximate volume of storm water flow at a particular site. By matching the flow pipe diameter with the estimated water flow rate, efficient flow rate readings can be consistently obtained.

A sampling device of commercially available type is also associated with the collector for periodically and automatically collecting samples for analysis as required.

Numerous other advantages and features of the present invention will become apparent from the following detailed description of the invention, from the claims and from the accompanying drawings.

BRIEF DESCRIPTION OF THE DRAWINGS

In the accompanying drawings forming a part of the specification, and in which like numerals are employed to designate like parts throughout.

DETAILED DESCRIPTION OF THE INVENTION

Figure 1:
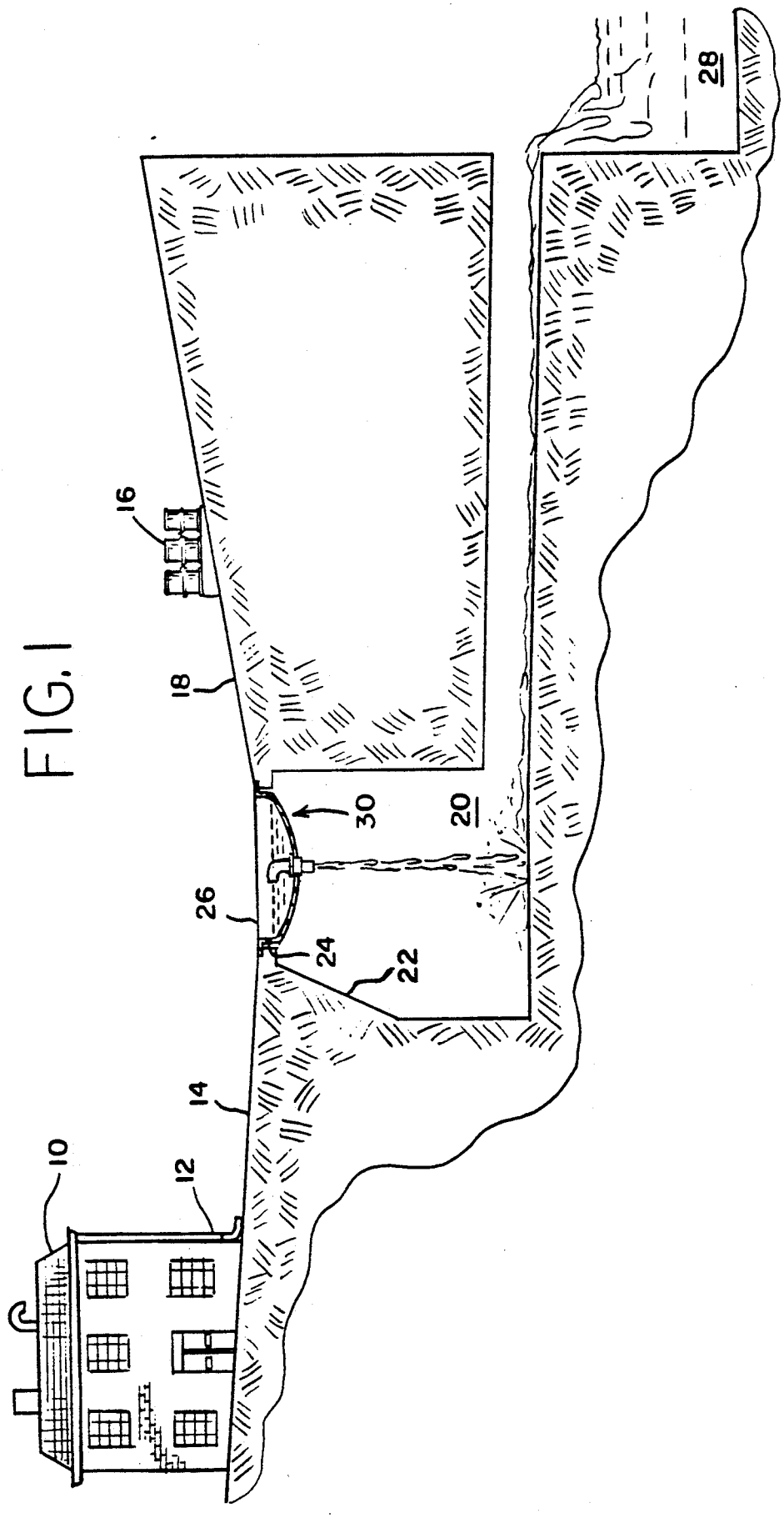
FIG. 1 is a diagrammatic view of a representative drainage area and storm sewer illustrating in section the apparatus of the invention operationally installed in the sewer manhole.

Referring with greater particularity to FIG. 1 of the drawings, there is illustrated a representative industrial site comprising a factory building 10 having a downspout 12 which is a source of storm water run-off down an inclined drainage surface 14. Supplies or waste materials 16 are placed outdoors on an inclined drainage surface 18 and storm waters will contact or pass through the materials 16 before running down the surface 18. The drainage surfaces 16 and 18, as well as any additional similar surfaces, converge to a common storm water sewer 20. The sewer 20 comprises a manhole 22 having a top rim 24 on which is removably supported a conventional apertured manhole cover 26. Storm water entering the sewer 20 flows independently before it merges with a regulated waterway or main storm sewer 28.

A primary measuring device or monitoring apparatus 30 embodying the principles of the invention is operationally mounted beneath the manhole cover 26 and positioned so that it receives or intercepts any water entering through said cover. Monitoring apparatus 30 comprises a liquid-impermeable collector bowl 32 which is generally circular in configuration and has an annular sidewall 34 and a concave bottom wall 36. An annular flange 38 is integrally formed with the sidewall 34 and, as illustrated in FIG. 1, said flange is dimensioned to support the bowl 32 on the rim 24 of the manhole 22 where it is further operationally retained by the manhole cover 26. The flange carries gasket means 39 for insuring a liquid-tight fit between the manhole rim and cover. The collector bowl 32 may be integrally molded of suitable sturdy plastics capable of supporting the weight of water collected therein and said bowl is, in this respect, similar to bowls that have heretofore been commonly employed to block off a sewer where it is desired to prevent flow into that sewer.

A central mounting hole 40 is formed in the bottom wall 36 of the collector bowl 32. A flow pipe 45 is operationally mounted in the hole 40 by removable means such as a threaded collar 42 providing a liquid-tight connection with the bowl 32. Accordingly, water can flow out of the bowl 32 only through the flow pipe 45.

Figure 3:
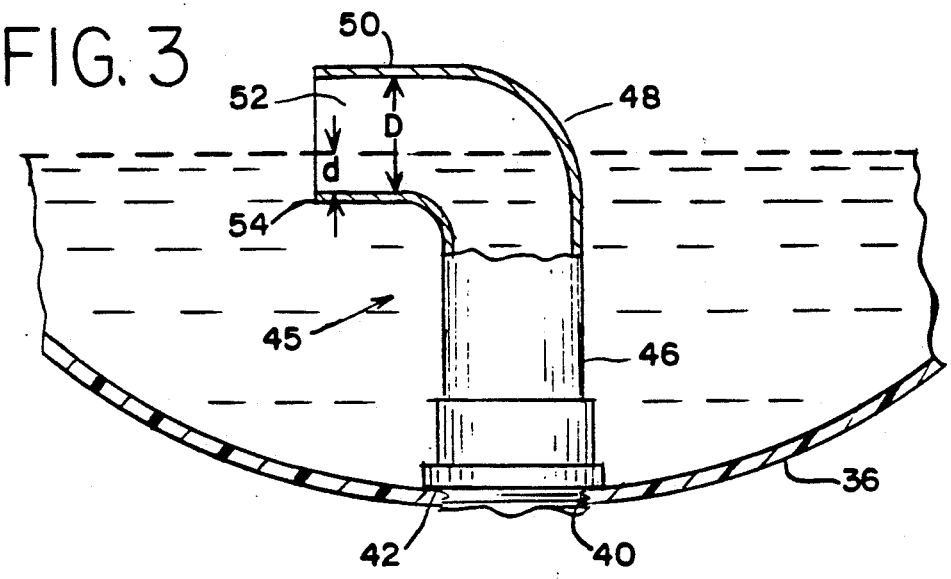
FIG. 3 is an enlarged fragmentary vertical sectional view of the apparatus of FIG. 2 and illustrating a condition of water flowing through the flow pipe.

Flow pipe 45 is open at both ends and comprises an upright leg 46, an elbow 48 and an arm 50 extending from the leg at a substantially right angle thereto. The arm 50 thus comprises an annular mouth 52 having a fixed diameter D. As is apparent from FIG. 3, water cannot enter the arm 50 to flow through the flow pipe 45 until the level of water in the bowl is above the bottom 54 of the arm 50, a level sometimes referred to as the zero flow point. When the level in the bowl exceeds the zero flow point, water flows through the arm 50 and pipe 45 at a measurable depth of flow, such as "d". The ratio of d/D is significant in rate flow measurement by the Manning formula as will be understood by those skilled in this art.

A secondary measuring device is operationally associated with the apparatus 30 for measuring and recording the storm water flow rate. In the embodiment illustrated, the sensing means comprises a bubbler tube 56 fixedly positioned on the bottom wall 36 of the collector bowl. The bubbler tube 56 may comprise a part of any of a number of commercially available flow meters. An example of such a flow meter is the Model 3230 of ISCO, Inc. which provides a number of programmable options for automatically recording flow rate based on primary measuring device characteristics, such as, flumes, weirs, vertical columns or the Manning formula.

Means 58 is provided for automatically and periodically collecting water samples from the storm water run-off for chemical analysis. The sample collector means can comprise any of the commercially available devices, an example of such devices being the Model 2900 Sampler of ISCO, Inc. In general, that type of sampling device includes a take-up line connected to a pump and a carousel or the like with a plurality of sample containers such as test tubes or the like.

Figure 2:
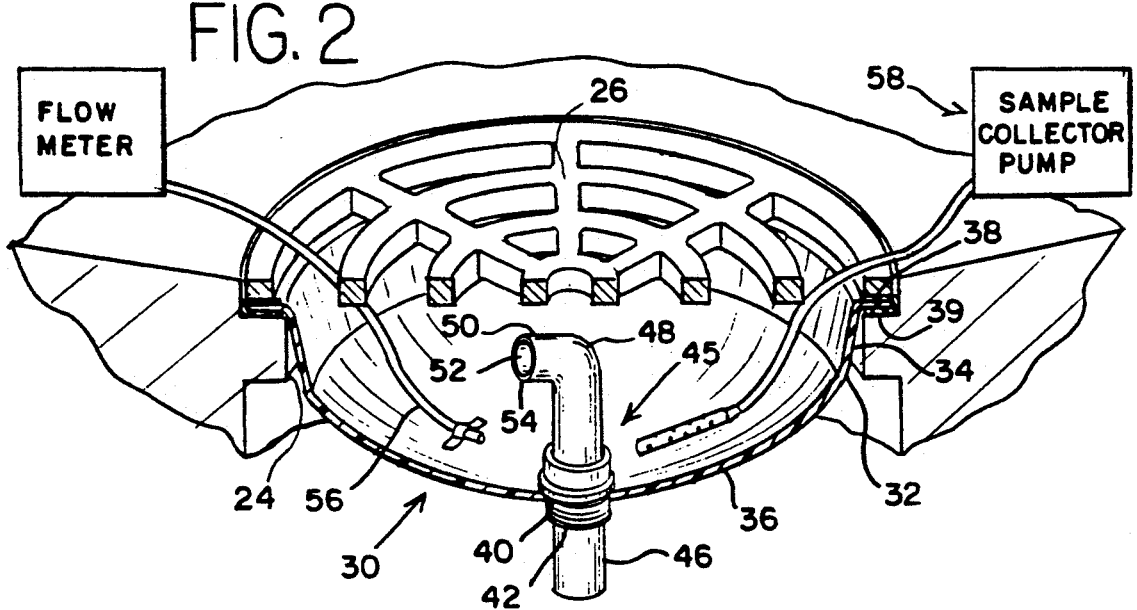
FIG. 2 is an enlarged fragmentary perspective view of a preferred embodiment of the apparatus.
Figure 4:
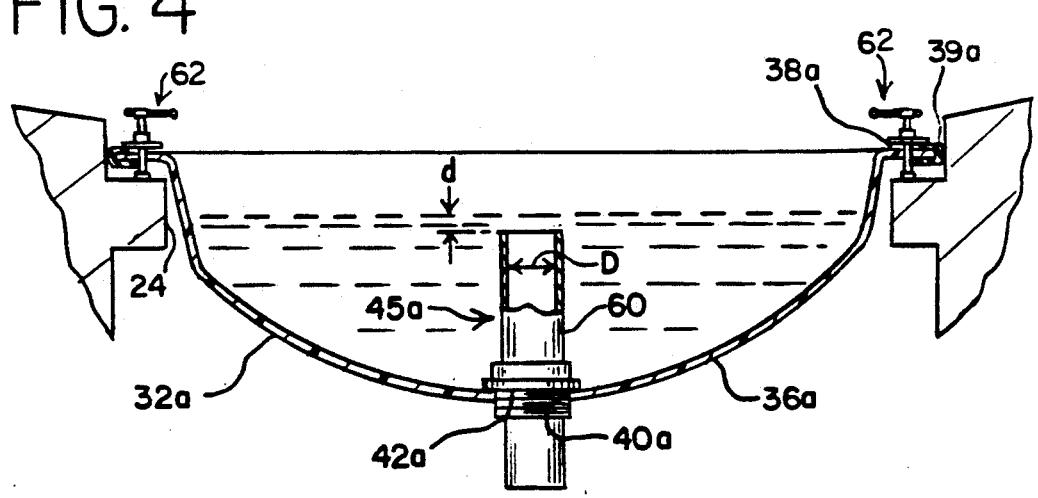
FIG. 4 is a fragmentary vertical sectional view of another preferred embodiment of the apparatus and illustrating a condition of water flowing through the flow pipe.

Referring to FIG. 4, there is shown another embodiment 30a of the monitoring apparatus. Flow pipe 45a here comprises an open-ended upright tube or standing pipe 60. As illustrated, the level of water accumulated in the collector bowl 32a must rise above the top of the pipe 60, the zero flow point, before water will flow down through the pipe. The sensing device and flow meter is responsive to the height of the water column d above the zero point and the meter is programmable for conversion and recording of the corresponding flow rate. As already indicated, this mode of flow rate measurement is generally the most accurate, but it is necessary that the pipe 60 be virtually perfectly vertical. Where compensation for a non-level manhole rim is necessary, the flange 38a is provided with a plurality of threaded leveling means such as 62 secured thereto. In the embodiment illustrated, the leveling means 62 comprises a finger-manipulatable screw projecting substantially above the flange 38a so that the manhole cover is removed. The leveling means could also comprise a regular slotted screw head requiring use of a screwdriver, but permitting seating of the manhole cover thereover as in FIG. 2.

From the foregoing, it should be apparent that the invention provides a novel primary measuring device which may be easily operationally installed to monitor the storm water run-off of an individual site and individual storm water sewer. Two modes of flow meter measurement are possible depending on conditions of use, and the ready removability of the flow pipe permits substitution of flow pipes of varying diameters to best match the estimated flow rate.

It should be appreciated that preferred embodiments of the invention have been described herein for illustrative purposes only and are not otherwise limiting of the structural and method concepts of the invention. Accordingly, changes and variations may be made by those skilled in the art without departing from the spirit and scope of the invention as defined in the appended claims.

What is claimed is:

1. Apparatus for indicating rate of flow of a liquid into a sewer having a manhole with a top rim comprising:
   a liquid-impermeable bowl having a flange projecting outwardly from the top edge thereof, said flange being operationally supported on the top rim of the manhole so that all liquid entering the sewer is collected first in said bowl;
   an open-ended standing pipe and mounting means mounting said standing pipe in a central hole in the bottom of said bowl, so that said standing pipe projects upwardly a first height from the bottom of said bowl whereby collected liquid rising to a second height above said first height flows through said standing pipe and into the sewer;
   flow meter means responsive to said second height operationally positioned in said bowl for measuring and recording the rate of flow; and
   leveling means mounted on said flange whereby said standing pipe is positionable to project in verticality.

2. Apparatus for indicating rate of flow of a liquid into a sewer having a manhole with a top rim comprising:
   a liquid-impermeable bowl having a flange projecting outwardly from the top edge thereof, said flange being operationally supported on the top rim of the manhole so that all liquid entering the sewer is collected first in said bowl;
   flow pipe means in said bowl projecting upwardly a first height from the bottom of said bowl whereby collected liquid rising to a second height above said first height flows through said flow pipe means and into the sewer; and
   flow meter means responsive to said second height operationally positioned in said bowl for measuring and recording the rate of flow;
   said flow pipe means comprising an open-ended bent pipe having an upright leg, an elbow bend and an arm substantially perpendicular to said leg, and mounting means mounting said leg in a central hole in the bottom wall of said bowl.

3. Apparatus according to claim 2 wherein said mounting means comprises removable means whereby bent pipes of varying diameters may be readily substituted.

4. A method for monitoring a liquid flowing into a sewer through an apertured manhole cover atop said sewer comprising:
   (a) positioning beneath the cover a collector bowl having an upright flow pipe therein;
   (b) collecting the liquid in the bowl until the liquid reaches a level sufficient to cause the liquid to flow through the pipe into the sewer; and
   (c) metering and recording the flow with flow meter means responsive to the flowing liquid level,
   the flow pipe of step (a) comprising an upper substantially horizontal arm, the liquid level in step (b) is the depth of the liquid flowing in said arm, and the flow meter means is responsive to the depth of the liquid flowing in said arm.

5. In combination with a storm water sewer having a manhole with a top rim, a storm water flow monitoring device comprising:
   a collector bowl having a top annular flange mounted on said top rim and closing the mouth of the manhole whereby all water entering the manhole is collected in said bowl;
   an apertured manhole cover atop said manhole and operationally retaining said flange on said top rim;
   a flow pipe in said bowl projecting upwardly from the bottom of the bowl so that the water collected in the bowl must rise to a flow level above the flow pipe before it flows through the pipe and into the sewer; and
   flow meter means responsive to the flow level positioned in the bowl and operative to measure and record the rate of flow of the water into the sewer,
   said flow pipe comprising an upright leg and a substantially horizontal arm and the flow level comprises the depth of the water in said arm, said flow meter means being responsive to said depth of water flowing in said arm.

6. In combination with a storm water sewer having a manhole with a top rim, a storm water flow monitoring device comprising:
   a collector bowl having a top annular flange mounted on said top rim and closing the mouth of the manhole whereby all water entering the manhole is collected in said bowl;
   an apertured manhole cover atop said manhole and operationally retaining said flange on said top rim;
   a flow pipe in said bowl projecting upwardly from the bottom of the bowl so that the water collected in the bowl must rise to a flow level above the flow pipe before it flows through the pipe and into the sewer; and
   flow meter means responsive to the flow level positioned in the bowl and operative to measure and record the rate of flow of the water into the sewer,
   said flow pipe comprising an open-ended standing pipe and the flow level comprising a height above the top of said standing pipe, said flow meter means being responsive to said height above the top of the standing pipe,
   and leveling means on said flange cooperable with the manhole top rim for positioning the standing pipe in substantial verticality.

* * * * *